(No Model.)
P. A. BENNETT.
LUBRICATOR.
No. 369,388.  Patented Sept. 6, 1887.
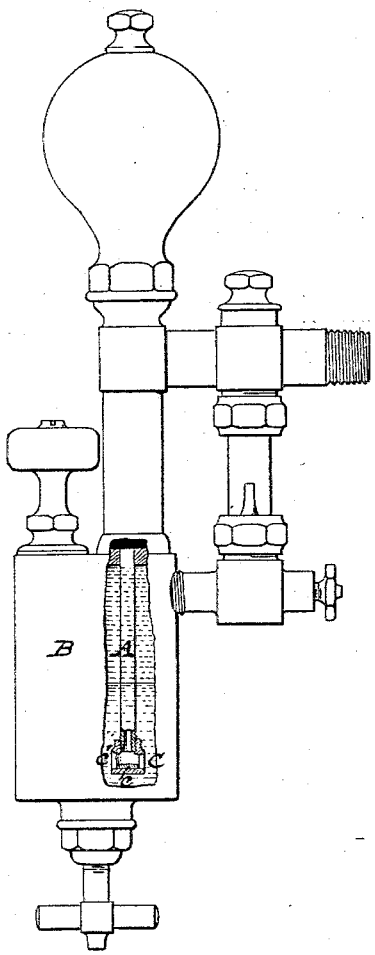
ATTEST:
C. P. Birks
A. Campbell
INVENTOR:
Phineas A. Bennett
by Robert Burns
Attorney.

UNITED STATES PATENT OFFICE.

PHINEAS A. BENNETT, OF CHICAGO, ILLINOIS, ASSIGNOR OF ONE-HALF TO THOMAS BENNETT, OF SAME PLACE.

LUBRICATOR.

SPECIFICATION forming part of Letters Patent No. 369,388, dated September 6, 1887.

Application filed October 11, 1886. Serial No. 215,939. (No model.)

*To all whom it may concern:*

Be it known that I, PHINEAS A. BENNETT, a citizen of the United States, and a resident of Chicago, in the county of Cook and State of Illinois, have invented a certain new and useful Improvement in Lubricators; and I do hereby declare the following to be a full, clear, and exact description of the same, reference being had to the accompanying drawings, forming a part of this specification, and in which—

Figure 1 is a side elevation, with parts broken away, of a lubricator embodying my improvement; Fig. 2, a detail section of the valve in the water-conducting pipe, and Fig. 3 a detail section of a modified form of the same.

Similar letters of reference indicate like parts in the several views.

This invention relates to that class of lubricators in which a hydrostatic column of water is employed to gradually displace the oil from a suitable reservoir in a drop-by-drop manner through a sight-feed tube that is in connection with the valve-chest or other article to be lubricated; and the object of the present improvement is to afford a cheap, simple, and efficient means to prevent the fluctuations or pulsations of the steam-supply affecting the drop-by-drop oil-feed by retarding its discharge, and which at the same time prevents any liability of the "siphoning" of the contents of the lubricator, due to a formation of a vacuum in the steam-chest, &c.

To enable others skilled in the art to which my invention appertains to make and use the same, I will now proceed to more fully describe its construction and mode of operation.

In the accompanying drawings I have illustrated my present improvement applied to the form of lubricator patented to me August 10, 1886, No. 347,284; yet it is equally applicable to any other form of lubricator of the same class.

In such drawings, A represents the pipe which conducts the oil-displacing body of water from the condenser to or near the bottom of the oil-reservoir B. To this pipe I connect a check-valve, C, adapted to close upward, so as to check any tendency to a reflux movement of the water back through such pipe and entirely and in an automatic manner prevent any such occurrence taking place, due to the fluctuations or pulsations of the steam-supply. By thus preventing a communication of such pulsations of the steam-supply to the contents of the lubricator the drop-by-drop oil-feed is rendered very free and uniform, and the irregularities of the same in the usual form of lubricators is very perfectly remedied.

The valve C may be arranged in any portion of the pipe A between its lower end and the bottom of the condensing-chamber; but it is preferable to arrange it at the bottom of such pipe, as indicated in Figs. 1 and 2; but when desired it can be in an intermediate position in the pipe, as indicated in Fig. 3.

The valve proper, $c$, is preferably made in the form of a flat disk inclosed in a suitable cage or casing, $c'$, having openings for the passage of the water around the valve, as indicated.

I am aware that prior to my invention it has been common to provide the oil-outlet passage of a lubricator with a check-valve to prevent a retrograde flow through the same; also, that in lubricators in which the water of condensation passes through a horizontal cross-passage before reaching the oil-receptacle such passage has been similarly provided with a check-valve for a similar purpose. I therefore do not claim such arrangement or combination, broadly; but What I do claim as my invention, and desire to secure by Letters Patent, is—

1. In a lubricator operated by a hydrostatic column, the combination of an oil-reservoir, a condenser, a water-conducting pipe, A, extending down through the interior of the oil-reservoir B, and an upwardly-closing valve, C, arranged at a point between the bottom of the condenser and the lower end of water-conducting tube A, essentially as set forth.

2. In a lubricator operated by a hydrostatic column, the combination of the water-conducting pipe A, extending down through the interior of the oil-reservoir B, and upwardly-closing valve C, arranged at the lower end of said pipe, as described, and for the purpose set forth.

In testimony whereof witness my hand this 8th day of October, 1886, at Chicago, Illinois.

PHINEAS A. BENNETT.

In presence of—
ROBERT BURNS,
A. CAMPBELL.